United States Patent

Yano et al.

[11] Patent Number: 6,076,476
[45] Date of Patent: Jun. 20, 2000

[54] METHOD OF AND APPARATUS FOR PREVENTING EMISSION OF DIOXINS IN INCINERATION FACILITY

[75] Inventors: Kiyotaka Yano, Kiyose; Minoru Sumitomo, Funabashi, both of Japan

[73] Assignee: Sumitomo Heavy Industries, Ltd., Tokyo, Japan

[21] Appl. No.: 09/030,449

[22] Filed: Feb. 25, 1998

[30] Foreign Application Priority Data

Apr. 15, 1997 [JP] Japan ................................. 9-096985

[51] Int. Cl.[7] .............................. F23B 7/00; F23J 15/00; F23N 5/00; F01K 7/34
[52] U.S. Cl. ........................ 110/345; 110/163; 110/185; 110/203; 110/234; 122/142; 60/678; 60/679
[58] Field of Search .................................. 110/203, 216, 110/297, 304, 306, 161, 150, 345, 344, 348, 342, 234, 215, 185, 186, 188, 190, 157, 163; 122/141, 142; 60/653, 678, 679

[56] References Cited

U.S. PATENT DOCUMENTS

| | | | |
|---|---|---|---|
| 1,137,420 | 4/1915 | Pomeroy | 110/306 |
| 2,800,888 | 7/1957 | Miller et al. | 110/190 X |
| 2,875,736 | 3/1959 | Stallkamp | 110/190 X |
| 3,002,347 | 10/1961 | Sprague | 110/342 |
| 4,465,027 | 8/1984 | Steinegger | 122/406 S |
| 4,489,679 | 12/1984 | Holt | 110/215 X |
| 4,573,418 | 3/1986 | Marzendorfer et al. | 110/345 |
| 4,909,160 | 3/1990 | Frick et al. | 110/185 |
| 5,040,470 | 8/1991 | Lofton et al. | 110/185 X |
| 5,357,881 | 10/1994 | Elcik et al. | 110/186 X |
| 5,658,361 | 8/1997 | Arencibia, Jr. | 110/215 X |

FOREIGN PATENT DOCUMENTS

| | | | |
|---|---|---|---|
| 4-116307 | 4/1992 | Japan | F23C 11/00 |
| 5-39915 | 2/1993 | Japan | F23J 9/00 |

*Primary Examiner*—Ira S. Lazarus
*Assistant Examiner*—Ljiljana V. Ciric
*Attorney, Agent, or Firm*—Arent, Fox, Kintner, Plotkin, Kahn

[57] ABSTRACT

An apparatus for preventing the emission of dioxins in an incineration facility including an incinerator having a boiler, and an exhaust gas treatment facility for treating exhaust gas discharged from a flue of the boiler. This apparatus further includes a steam supply pipe for supplying steam into a water tube or a downcomer of the boiler from an auxiliary boiler or another steam-generating source, a flue damper for opening and closing the flue of the boiler, a detector for detecting the temperature of gas within the boiler at a point disposed upstream of the flue damper, and a damper control device responsive to a temperature, detected by the detector, for opening and closing the flue damper. In a starting operation of the incineration facility, the flue damper is closed, and in this condition steam is supplied into the water tube or the downcomer of the boiler from the steam supply pipe, thereby raising the temperature of a body of the boiler, and also raising the temperature of gas within the boiler through boiler water, and the flue damper is opened when the detector detects the fact that the gas within the boiler reaches a predetermined temperature, thereby preventing dioxins, residing or remaining in the incineration facility, from being discharged to the exterior.

5 Claims, 2 Drawing Sheets

METHOD OF AND APPARATUS FOR PREVENTING EMISSION OF DIOXINS IN INCINERATION FACILITY

BACKGROUND OF THE INVENTION

1. Field of the Invention

This invention relates to a method of and an apparatus for preventing the emission of dioxins in an incineration facility, particularly, refuse incineration facility having a boiler.

2. Related Art

In a starting operation of a conventional refuse incineration facility having a boiler (see FIG. 1), an auxiliary burner was used, or refuse was directly burned in order to raise the temperature of an incinerator a and the temperature of boiler water in the boiler b. Low-temperature combustion gas, produced at an initial stage of this starting operation, inflicts damage, such as low-temperature corrosion, to an exhaust gas treatment facility c, and therefore it is a common practice to discharge this combustion gas via a by-pass duct d and a stack f, thus causing the exhaust gas to by-pass the exhaust gas treatment facility c (see thick arrows in FIG. 1).

At this time, there is a possibility that dust, containing hazardous substances, such as dioxins, remaining in the incinerator a and the boiler b, or highly-concentrated dioxins, produced during the starting operation of the incinerator a, deposit on an exhaust gas passage e and the stack f, provided downstream of the exhaust gas treatment facility c, to contaminate these portions, and there is also a possibility that semi-volatile precursors deposit and remain on these portions.

When such contamination substances are deposited and remain, there is a fear that after the steady operation of the incinerator a is started, these substances are emitted as gaseous dioxin or as dioxine adsorbed by particle-like dust, and are contained in the exhaust gas passed through the exhaust gas treatment facility c, and then are discharged via the stack f.

For example, in order to avoid damage due to dew condensation in a bag filter serving as the exhaust gas treatment facility c, it was necessary to discharge the gas via the by-pass duct d until the temperature of the gas rose to 120 to 130° C.

As a result, the exhaust gas, though for a short period of time, continued to be discharged through the by-pass duct d until the temperature rose to a level at which the exhaust gas treatment facility c became usable, and this could form one of the causes of the increased dioxin emission concentration.

SUMMARY OF THE INVENTION

It is an object of this invention to provide a system in which low-temperature exhaust gas, which is produced at an initial stage of a starting operation, and has heretofore been discharged in an untreated form, can be treated in an exhaust gas treatment facility, thereby eliminating the possibility that dioxins, produced during the starting operation of an incinerator, are discharged.

According to one aspect of the present invention, there is provided a method of preventing the emission of dioxins in an incineration facility comprising an incinerator having a boiler, and an exhaust gas treatment facility for treating exhaust gas discharged from a flue of the boiler, comprising the steps of:

supplying steam into a water tube or a downcomer of the boiler via a steam supply pipe, connected thereto, at the time of a starting operation, thereby raising a temperature of a body of the boiler, and also raising a temperature of gas within the boiler through boiler water; and initiating the flow of the gas into the exhaust gas treatment facility after the gas within the boiler reaches a predetermined temperature.

According to another aspect of the invention, there is provided an apparatus for preventing the emission of dioxins in an incineration facility comprising an incinerator having a boiler, an exhaust gas treatment facility for treating exhaust gas discharged from a flue of the boiler, and a stack for discharging the exhaust gas, treated by the exhaust gas treatment facility; the apparatus comprising:

a steam supply pipe for supplying steam into a water tube or a downcomer of the boiler from an auxiliary boiler or another steam-generating source;

a flue damper for opening and closing the flue of the boiler;

means for detecting a temperature of gas within the boiler at a point disposed upstream of the flue damper; and control means for opening the flue damper when the temperature detection means detects the fact that the gas within the boiler reaches a predetermined temperature.

DESCRIPTION OF THE PREFERRED EMBODIMENT

Figure 1:
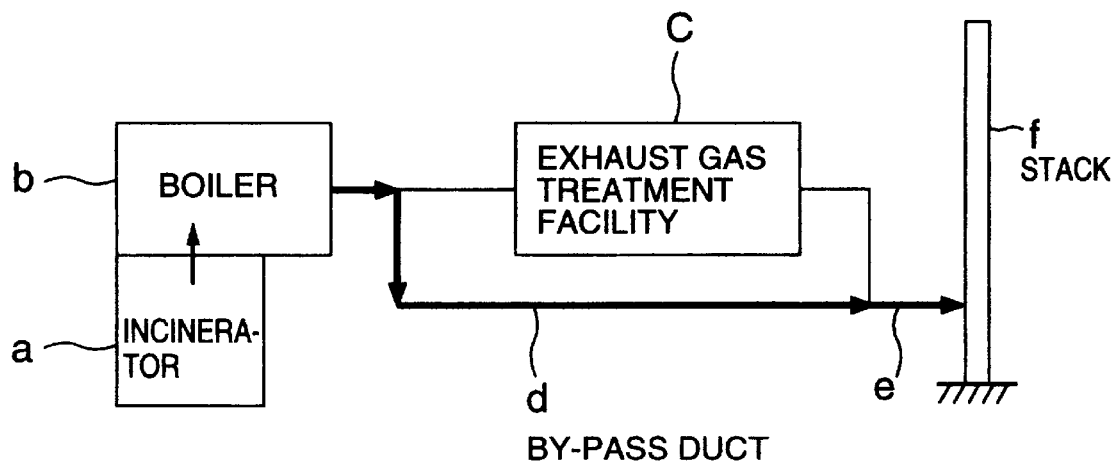
FIG. 1 is a schematic view showing the flow of low-temperature gas in a conventional incineration facility.
Figure 2:
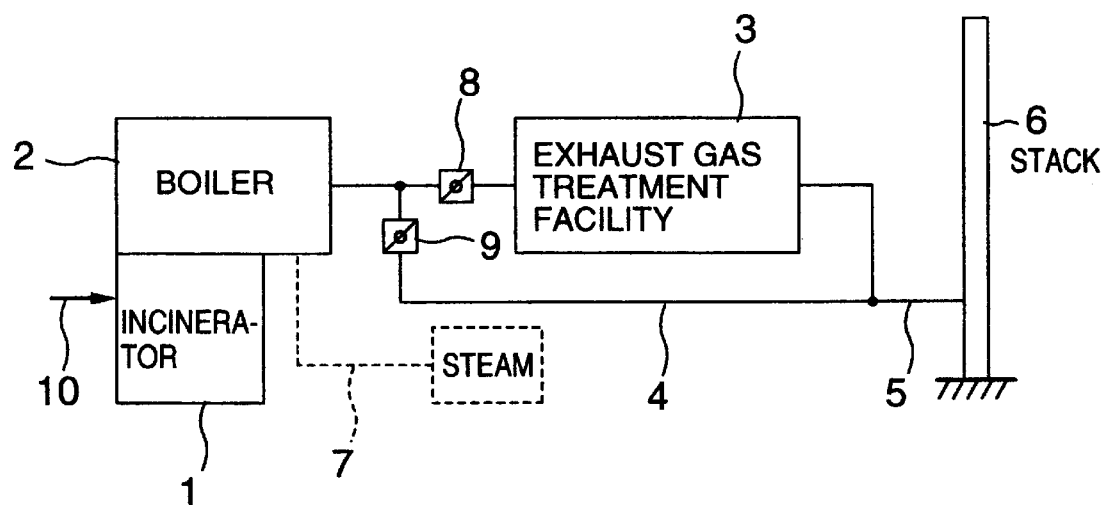
FIG. 2 is a schematic view showing an apparatus of the invention for preventing the emission of dioxins in an incineration facility.

A preferred embodiment of the present invention will now be described with reference to the drawings. In FIG. 2, an apparatus for preventing the emission of dioxins in an incineration facility comprises an incinerator 1 having a boiler 2, an exhaust gas treatment facility 3 for treating exhaust gas discharged from a flue of the boiler 2, and a stack 6 for discharging the exhaust gas, treated in the exhaust gas treatment facility 3.

A steam supply pipe 7 is connected to a water tube or a downcomer of the boiler 2, and steam is supplied or injected into the boiler 2 from an auxiliary boiler or another steam-generating source. The exhaust gas treatment facility 3 is connected to the flue of the boiler 2 via flue dampers 8, and by opening the flue dampers 8, the exhaust gas can flow to the exhaust gas treatment facility 3. The exhaust gas treatment facility 3 has the function of removing or reducing dioxins, for example, by a bag filter, an activated-carbon filter or an oxidative destruction catalyst.

A by-pass duct 4 is connected to the flue of the boiler 2 via a by-pass damper 9. This by-pass damper 9 is normally closed, and only in the event of an emergency such as a malfunction of the exhaust gas treatment facility 3, the by-pass damper 9 is opened to cause the exhaust gas to by-pass the exhaust gas treatment facility 3 and then to be discharged from the stack 6.

Figure 3:
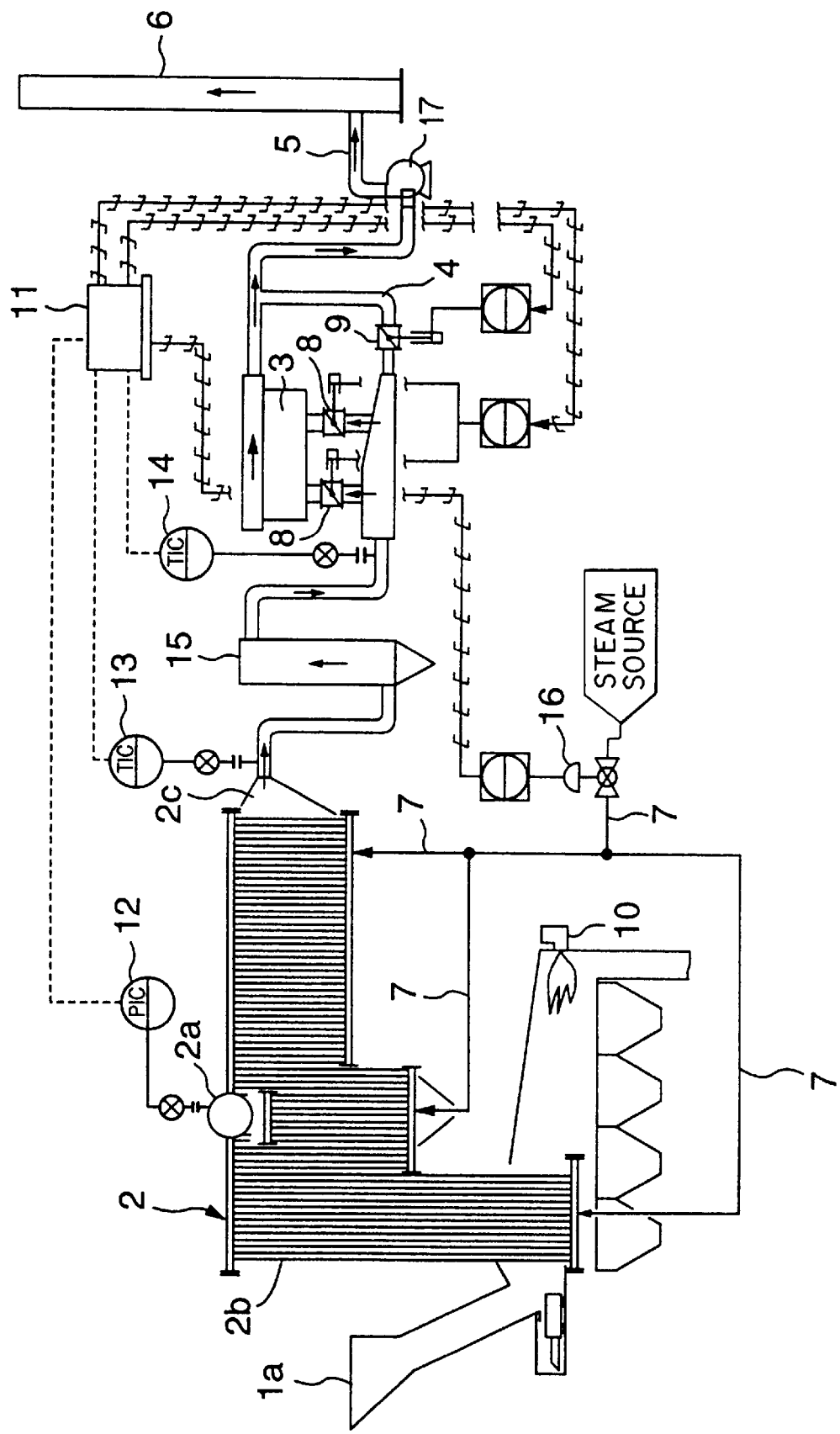
FIG. 3 is a view showing the procedure of a starting operation of the incineration facility of the invention.

The procedure of a starting operation of the incinerator 1 will now be described with reference to FIGS. 2 and 3.

(1) Steam is supplied from the steam supply pipe 7 connected to the water tube 2b or the downcomer of the boiler 2. This steam is supplied from the auxiliary boiler (not shown) or the steam-generating source, and by opening a valve 16, the steam can be supplied into the boiler 2. The opening and closing of the valve 16 are controlled by a control panel 11. When supplying the steam, the flue dampers 8, leading to the exhaust gas treatment facility 3, and the by-pass damper 9 are closed, thereby keeping the gas within the boiler 2 in a sealed condition.

(2) The supply of the steam into the boiler 2 is continued until the temperature of a body of the boiler 2 rises, and further until the temperature of the gas in the boiler 2 is raised through boiler water to a level at which the gas can be passed to the exhaust gas treatment facility 3. The temperature of the gas in the boiler 2 is monitored by a temperature indication controller 13 provided at an outlet of the flue 2c, and the pressure within the boiler 2 is monitored and controlled by a pressure indication controller 12 provided at a steam drum 2a.

(3) When the gas within the boiler 2 reaches a predetermined temperature (about 150° C.), the flue dampers 8, leading to the exhaust gas treatment facility 3, are opened, thereby initiating the flow of the gas into the exhaust gas treatment facility 3. The exhaust gas passes through the flue 2c of the boiler 2, a flue gas cooler 15 and the flue dampers 8, and flows into the exhaust gas treatment facility 3. The gas temperature at an inlet of the exhaust gas treatment facility 3 is monitored by a temperature indication controller 14, and the opening and closing of the flue dampers 8, as well as the opening and closing of the by-pass damper 9, are controlled by the control panel 11.

(4) After the flow of the gas into the exhaust gas treatment facility 3 is initiated, an auxiliary burner 10, provided at the incinerator 1, is ignited, and when the temperature of the incinerator 1 reaches a level (about 800° C.) at which the production of dioxins is suppressed, refuse or garbage is charged into the incinerator 1 through a refuse-charging port 1a, and the incineration is started, so that the temperature of the incinerator 1 continues to rise. The exhaust gas, treated by the exhaust gas treatment facility 3, is discharged via an exhaust gas passage 5 and the stack 6 by an induced draft fan 17. At this time, the supply of the steam into the boiler 2 is stopped or continued by closing or opening the valve 16 according to the need.

(5) At the time when the temperature of the incinerator 1 reaches about 850° C., the auxiliary burner 10 is stopped, thus completing the starting operation.

In the present invention, in the starting operation of the incineration facility having the boiler, steam is supplied into the water tube or the downcomer of the boiler, thereby raising the temperature of the boiler water, and dust (which contains hazardous substances) in the boiler, is caused to reside together with the inside air, and after the temperature of the gas reaches a level at which the gas can flow through the exhaust gas treatment facility, the auxiliary burner is ignited, thereby continuing the subsequent temperature rise. Therefore, the low-temperature gas, which has heretofore been discharged in an untreated form, is sealed in the boiler, and after the conditions, required for the treatment in the exhaust gas treatment facility, are established, the gas is treated therein, and then is discharged. Namely, by supplying steam into the water tube or the downcomer of the boiler, the temperature of the gas within the boiler is raised without flowing the gas (air) within the boiler, and by doing so, the exhaust gas treatment facility for removing dust (which contains hazardous substances such as dioxins) in the exhaust gas, can be most effectively used without exposing the exhaust gas treatment facility to an undesirable environment which causes low-temperature corrosion, thereby eliminating the possibility of environmental pollution.

What is claimed is:

1. A method for preventing the emission of dioxins in an incineration facility comprising an incinerator having a boiler, and an exhaust gas treatment facility for treating exhaust gas discharged from a flue of said boiler, comprising the steps of:

supplying steam into a water tube or a downcomer of said boiler via a steam supply pipe, connected thereto, at the time of a starting operation, thereby raising the temperature of exhaust gas within said boiler; and initiating a flow of the exhaust gas into said exhaust gas treatment facility after the exhaust gas within said boiler reaches a predetermined temperature.

2. A method according to claim 1, in which the flow of the exhaust gas into said exhaust gas treatment facility is initiated after the gas within said boiler reaches about 150° C.

3. A method according to claim 1, further comprising, after said initiating step, igniting an auxiliary burner, provided at the incinerator;

initiating the charge of refuse or garbage into the incinerator after the temperature of a incinerator reaches a first predetermined amount; and stopping the auxiliary burner after the temperature of the incinerator reaches a second predetermined amount.

4. An apparatus for preventing the emission of dioxins in an incineration facility comprising an incinerator having a first boiler, an exhaust gas treatment facility for treating exhaust gas discharged from a flue of said first boiler, and a stack for discharging the exhaust gas, treated by said exhaust gas treatment facility; said apparatus comprising:

a steam supply pipe for supplying steam into a water tube or a downcomer of said first boiler from an auxiliary boiler or another steam-generating source external to said first boiler;

a flue damper for opening and closing the flue of said first boiler;

means for detecting a temperature of exhaust gas within said first boiler at a point disposed upstream of said flue damper; and control means for opening said flue damper when said temperature detection means detects that the exhaust gas within said first boiler reaches a predetermined temperature.

5. An apparatus according to claim 4, in which said control means opens said flue damper after the temperature of the exhaust gas within said first boiler reaches about 150° C.

* * * * *